United States Patent
Kuramoto et al.

(10) Patent No.: US 9,553,283 B1
(45) Date of Patent: Jan. 24, 2017

(54) MOLDING PACKAGING MATERIAL AND BATTERY CASE

(71) Applicant: Showa Denko Packaging Co., Ltd., Isehara-shi, Kanagawa (JP)

(72) Inventors: Tetsunobu Kuramoto, Isehara (JP); Yuuji Minamibori, Isehara (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 0 days.

(21) Appl. No.: 15/275,618

(22) Filed: Sep. 26, 2016

Related U.S. Application Data

(62) Division of application No. 14/007,652, filed as application No. PCT/JP2012/058393 on Mar. 29, 2012.

(30) Foreign Application Priority Data

Mar. 29, 2011 (JP) ................................. 2011-072461

(51) Int. Cl.
  *H01M 2/04* (2006.01)
  *H01M 2/02* (2006.01)
  *H01M 10/0525* (2010.01)

(52) U.S. Cl.
  CPC ....... *H01M 2/0287* (2013.01); *H01M 10/0525* (2013.01)

(58) Field of Classification Search
  CPC .................. H01M 2/0287; H01M 10/0525
  See application file for complete search history.

(56) References Cited

PUBLICATIONS

Kuramoto et al., "Molding Packaging Material and Battery Case", U.S. Appl. No. 14/007,652, filed Nov. 27, 2013.

*Primary Examiner* — Jane Rhee
(74) *Attorney, Agent, or Firm* — Keating and Bennett, LLP

(57) ABSTRACT

Provided is a molding packaging material that can have an increased use life, can suppress a decrease over time in inter-layer lamination strength, and can have superior molding properties in extrusion molding, draw forming, and the like. The laminate molding packaging material contains: an outside substrate layer (2) comprising a heat resistant resin; an inside sealant layer (3) comprising a thermoplastic resin; and a metal foil provided between the two layers as a barrier layer (4). A matte coat layer (6) comprising a heat resistant resin coating film containing a dispersion of inorganic or organic solid microparticles is formed on the outer surface of the outside substrate layer (2), and the gloss value of the surface thereof is suppressed to no greater than 30%.

4 Claims, 1 Drawing Sheet

US 9,553,283 B1

MOLDING PACKAGING MATERIAL AND BATTERY CASE

TECHNICAL FIELD

The present invention relates to a laminate molding packaging material which is molded into a tray shape by draw forming or bulging to be used. More specifically, the present invention relates to a laminate packaging material which is suitably used as a case material of secondary batteries, such as lithium ion batteries for notebook personal computers, cellular phones, and on-vehicle and fixed type power sources, and further is suitably used also as a packaging material for foods, pharmaceuticals, and the like.

TECHNICAL BACKGROUND

Heretofore, as packaging materials for foods, such as retort foods, pharmaceuticals, or industrial chemicals, a laminate packaging material which contains a metallic foil excellent in barrier properties of oxygen or moisture and in which the metallic foil is laminated between a substrate film and a sealant layer in order to prevent the chemical change, degradation, decomposition, and the like of contents has been widely used (Patent Document 1).

On the other hand, in recent years, in connection with a reduction in the size and the weight of various electronic devices, such as OA devices (e.g., personal computers), cellular phones, game machines, headphone stereos, and electronic notebooks, a lithium ion polymer secondary batteries has been increasingly used from the viewpoint of achieving a reduction in the size and the weight also as a battery of a power source portion in many cases. In the lithium ion polymer secondary battery, when an electrolytic solution in the battery reacts with water and then hydrofluoric acid is generated, a reduction in the performance of the battery is caused or liquid leakage occurs by corrosion of the case. Therefore, the same laminate packaging material as above having excellent water vapor barrier properties and high sealing properties has been increasingly used as a material for use in the case (storing case).

More specifically, as the case material of the lithium ion polymer secondary battery (packaging material), a laminate packaging material in which an outer layer containing a heat-resistant resin film of a polyester type, an epoxy type, an acrylic type, or the like, an intermediate layer mainly containing an aluminum foil as a water vapor barrier layer, and an inside sealant layer containing a heat adhesive polyolefin resin for sealing a polymer electrolyte which is the content are laminated in order and integrated has been used (Patent Documents 2 and 3).

The laminate packaging material for battery case described above is molded into a three-dimensional rectangular parallelepiped shape or the like by bulging or deep draw forming in order to increase the capacity as much as possible to charge a polymer electrolyte, and then used as a battery case in many cases.

PRIOR ART DOCUMENTS

Patent Documents

Patent Document 1: Japanese Unexamined Patent Application Publication No. 2004-319414
Patent Document 2: Japanese Unexamined Patent Application Publication No. 2001-202928
Patent Document 3: Japanese Unexamined Patent Application Publication No. 2001-266810

SUMMARY OF INVENTION

Problems to be Solved by the Invention

However, in the above-described known laminate packaging materials, the molding properties when molded into a tray shape are generally poor and there is a possibility such that cracks and pinholes are generated by bulging or draw forming. Therefore, the laminate packaging materials have had a disadvantage in that the laminate packaging materials are difficult to be molded into a desired depth with sufficiently high capacity.

Moreover, in most of the above-described known laminate packaging materials, since the aluminum foil as a barrier layer and the inside sealant layer are bonded using a two component mixed adhesive in which a main agent having a common hydroxyl group and a curing agent having an isocyanate group are mixed, the lamination strength between the aluminum foil and the sealant layer decreases with time due to an electrolytic solution which is the content, and consequently the electrolytic solution which is the content may leak. Therefore, there has been a problem in that a desired increase in life has not been achieved.

The present invention has been made in view of the technical background described above. It is a first object of the invention to provide a molding packaging material whose molding properties are improved and which can achieve molding with sharpness and a high depth without generating cracks and pinholes.

In addition, it is another object of the present invention to provide a molding packaging material in which a reduction in the interlayer lamination strength caused by an influence of an electrolytic solution can be prevented and a reduction in the interlayer lamination strength caused by an influence of a generation of heat and an expansion and a contraction of the packaging material due to a repetition of charge and discharge can be prevented, so that the interlayer lamination strength is excellent, to prevent causing poor appearance even when an electrolytic solution adheres to the surface, and further to provide a manufacturing method capable of manufacturing such a molding packaging material with good productivity.

The other purposes and advantages of the present invention are clarified from a description of preferable embodiments described below.

Means for Solving the Problems

In order to achieve the objects, the present invention provides the following measures.

[1] A molding packaging material, containing an outside substrate layer containing a heat-resistant resin, an inside sealant layer containing a thermoplastic resin, and a metallic foil as a barrier layer provided between the layers, in which a matte coat layer containing a heat-resistant resin composition containing a dispersion of inorganic and/or organic solid fine particles is formed by coating on the outside surface of the outside substrate layer and the gloss value of the surface on the side of the matte coat layer is set to 30% or lower.

[2] A molding packaging material, containing an outside substrate layer containing a heat-resistant resin, an inside sealant layer containing a thermoplastic resin, and a metallic foil as a barrier layer provided between the layers, in which at least an inside surface of the metallic foil layer is subjected to chemical conversion treatment, an inside adhesion resin layer having adhesiveness to both the metallic foil as the barrier layer and the resin of the inside sealant layer is laminated on the chemical conversion-treated surface, the inside sealant layer is further laminated through the adhesion resin layer, the outside substrate layer contains a biaxially oriented polyamide resin film, a matte coat layer containing a resin composition containing a dispersion of inorganic and/or organic solid fine particles in a heat-resistant resin component is formed by coating on the outside surface of the outside substrate layer, and the gloss value of the surface on the side of the matte coat layer is set to 30% or lower.

[3] The molding packaging material described in [1] or [2] above, in which the gloss value is 1% to 15%.

[4] The molding packaging material described in any one of [1] to [3] above, in which the heat-resistant resin composition of the matte coat layer contains a heat-resistant resin in which fluorine is added to the skeleton of a main agent as the main component.

[5] The molding packaging material described in [4] above, in which the heat-resistant resin composition of the matte coat layer contains a two component curing type heat-resistant resin containing a copolymer of tetrafluoroolefin and carboxylic acid vinyl ester as the main component.

[6] The molding packaging material described in [5] above, in which the heat-resistant resin composition of the matte coat layer further contains a urethane resin and/or an acrylic resin.

[7] The molding packaging material described in any one of [1] to [6] above, in which, in the heat-resistant resin composition of the matte coat layer, 0.1 to 60 wt % of a dispersion of inorganic and/or organic solid fine particles having an average particle diameter of 1 µm to 10 µm is contained in the heat-resistant resin component.

[8] The molding packaging material described in any one of [1] to [7] above, in which the inside sealant layer contains a propylene homopolymer or a copolymer containing at least propylene and ethylene as a copolymerization component.

[9] The molding packaging material described in [8] above, in which the inside sealant layer is a polymer or a copolymer having a melting point of 130° C. to 160° C. and an MFR of 1 to 25 g/10 min.

[10] The molding packaging material described in any one of [2] to [9] above, in which the inside adhesion resin layer contains an adhesive containing a polyolefin resin having a carboxyl group and a multifunctional isocyanate compound.

[11] The molding packaging material described in [10] above, in which an equivalent ratio [NCO]/[OH] of an isocyanate group of the multifunctional isocyanate compound to a hydroxyl group constituting the carboxyl group of the polyolefin resin is 1.0 to 10.0.

[12] The molding packaging material described in [10] or [11] above, in which, in the polyolefin resin having a carboxyl group, the melt flow rate (MFR) measured at 130° C. is 5 to 40 g/10 min.

[13] A battery case, which is obtained by performing deep draw forming or bulging of the molding packaging material described in any one of [1] to [12] above.

[14] The molding packaging material described in any one of [1] to [12] above, which is used as a packaging material for foods or pharmaceuticals.

[15] A method for manufacturing a molding packaging material, including a process of subjecting at least one surface of a metallic foil for a barrier layer to chemical conversion treatment, a process of bonding a biaxially oriented polyamide film to the other surface of the metallic foil with an outside adhesive to form an outside substrate layer, a process of applying a resin composition in which 0.1 to 60 wt % of a dispersion of inorganic and/or organic solid fine particles having an average particle diameter of 1 µm to 10 µm is contained in a two component curing type heat-resistant resin containing a copolymer of tetrafluoroolefin and carboxylic acid vinyl ester to the surface of the outside substrate layer, and then drying to form a matte coat layer whose gloss value is controlled to be 1 to 30%, a process of forming an inside adhesion resin layer having adhesiveness to both the metallic foil as the barrier layer and a resin of an inside sealant layer described later on one chemical conversion-treated surface of the metallic foil, a process of laminating and forming the sealant layer containing a thermoplastic resin on the inside adhesion resin layer, and a process of heat treating a laminate obtained by the processes above with a heat roll heated to 130° C. to 220° C. in such a manner that the outside substrate layer is on the side of the heat roll.

[16] The method for manufacturing a molding packaging material described in [15] above, in which a resin containing a propylene homopolymer or a copolymer resin containing at least propylene and ethylene as a copolymerization component and having a melting point of 130° C. to 160° C. and an MFR of 1 to 25 g/10 min is used as the thermoplastic resin of the sealant layer.

[17] The method for manufacturing a molding packaging material described in [15] or [16] above, in which the inside adhesion resin layer is formed by applying and drying an adhesion resin containing a polyolefin resin having a carboxyl group and a multifunctional isocyanate compound and having an equivalent ratio [NCO]/[OH] of an isocyanate group of the multifunctional isocyanate compound to a hydroxyl group constituting the carboxyl group of the polyolefin resin of 1.0 to 10.0.

Effects of the Invention

According to the invention of [1] above, due to the fact that the matte coat layer containing a heat-resistant resin composition containing a dispersion of inorganic and/or organic solid fine particles is formed on the outside surface of the outside substrate layer containing a heat-resistant resin and the gloss value of the surface is controlled to 30% or lower, favorable slipping properties are imparted to the surface of the packaging material. More specifically, when the gloss value exceeds 30%, the surface roughness becomes small and the surface slipping properties are reduced. Therefore, when the gloss value is set to a value equal to or lower than the value, the packaging material excellent in molding properties which is the initial purpose of the present invention can be provided. The, gloss value is a value measured at an incident angle of 60° according to JISK7105.

According to the invention of [2], the molding packaging material contains the outside substrate layer, the inside sealant layer, and the metallic foil layer provided between these layers, in which at least an inside surface of the metallic foil is subjected to chemical conversion treatment and an adhesion resin layer having adhesiveness to both the metallic foil and the resin of the inside sealant layer is laminated on the chemical conversion-treated surface, and therefore the interlayer lamination strength of the sealant layer and the metallic foil layer can be sufficiently secured. Moreover, since the outside substrate layer is a biaxially oriented polyamide film, molding packaging material is excellent in molding properties. Furthermore, a heat-resistant resin composition containing a dispersion of inorganic and/or organic solid fine particles is applied to the surface, so that the matte coat layer whose surface gloss value is 30% or lower is formed thereon, and therefore the surface slipping properties are good, the molding properties are excellent, and the appearance is not impaired even when an electrolytic solution adheres. When the molding packaging material is used as a battery case, for example, a reduction in the interlayer lamination strength of the barrier layer of the metallic foil and the inside sealant layer caused by an influence of an electrolytic solution can be prevented and a reduction in the interlayer lamination strength caused by an influence of a generation of heat and an expansion and a contraction of the packaging material due to a repetition of charge and discharge can also be prevented, so that sufficient sealing performance can be secured. Furthermore, since at least one surface of the metallic foil layer is subjected to the chemical conversion treatment, a corrosion of the surface of the metallic foil caused by contents (an electrolytic solution of a battery, foods, pharmaceuticals, and the like) can be sufficiently prevented.

According to the invention of [3], since the gloss value of the outside surface of the packaging material by the formation of the matte coat layer is set to 1 to 15%, a problem in the appearance which may occur when the gloss value is lower than 1%, i.e., a problem such that irregularities of the surface become excessively large, so that the packaging material becomes slightly undesirable in the appearance, can be avoided and further an improvement effect of the molding properties obtained due to the fact that the gloss value is 15% or lower can be favorably and stably achieved.

According to the invention of [4], due to the fact that the heat-resistant resin composition of the matte coat layer contains the heat-resistant resin in which fluorine is added to the skeleton of the main agent as the main component, it is a matter of course that the surface slipping properties can be made more favorable and the molding properties can be improved, and further the packaging material whose surface antifouling property can be improved, so that even when an electrolytic solution or the like adheres, the appearance may not be noticeably impaired is provided.

According to the invention of [5], due to the fact that the two component curing type heat-resistant resin containing the copolymer of tetrafluoroolefin and carboxylic acid vinyl ester is selected as the heat-resistant resin to which fluorine is added, an improvement effect of the molding properties by imparting the surface slipping properties and a prevention effect of appearance degradation due to adhesion of an electrolytic solution can be more certainly and favorably achieved.

According to the invention of [6], due to the fact that a urethane resin and/or an acrylic resin is further contained in the heat-resistant resin of the invention of [5] above, the strength of the matte coat layer is increased and also good molding properties can also be imparted to itself.

According to the invention of [7], since inorganic and/or organic solid fine particles having an average particle diameter of 1 to 10 μm are used as a control material of the surface gloss value of the matte coat layer and a dispersion thereof is contained in the heat-resistant resin component in the range of 0.1 to 60 wt %, the gloss value of the matte coat layer can be easily controlled to 30% or lower and preferably 1 to 15% or lower.

According to the invention of [8], since the sealant layer is formed with a propylene homopolymer or a copolymer resin containing at least propylene and ethylene as a copolymerization component, sufficient heat resistance can be secured and excellent sealing performance can be secured.

According to the invention of [9], since the melting point of the polymer or the copolymer of the invention of [8] above is 130 to 160° C. and the MFR thereof is 1 to 25 g/10 min, sufficient heat resistance can be secured and moderate fluidity can be realized in sealing, so that excellent sealing performance can be secured.

According to the invention of [10], due to the fact that the inside adhesion resin layer is an adhesive containing a polyolefin resin having a carboxyl group and a multifunctional isocyanate compound, a reduction with time in the lamination strength between the metallic foil and the inside sealant layer caused by an influence of an electrolytic solution in the use as a battery case can be effectively reduced and prevented.

According to the invention of [11], since the equivalent ratio [NCO]/[OH] of an isocyanate group of the multifunctional isocyanate compound to a hydroxyl group constituting a carboxyl group of the polyolefin resin in the adhesive is 1.0 to 10.0, the packaging material for battery case in which the interlayer adhesion strength hardly decreases over a longer period of time and the useful life is long is provided.

According to the invention of [12], since the melt flow rate measured at 130° C. of the olefin resin having a carboxyl group is 5 to 40 g/10 min, the packaging material in which the useful life is longer in the use as the packaging material for battery case can be provided.

According to the invention of [13], a battery case which has high interlayer lamination strength without molding defects is provided.

According to the invention of [14], a food packaging material or a pharmaceutical packaging material having high interlayer lamination strength is provided.

According to the invention of [15], the method for manufacturing a molding packaging material, includes the process of subjecting at least one surface of a metallic foil for a barrier layer to chemical conversion treatment, the process of bonding a biaxially oriented polyamide film to the other surface of the metallic foil with an outside adhesive to form an outside substrate layer, the process of applying a resin composition in which 0.1 wt % to 60 wt % of a dispersion of inorganic and/or organic solid fine particles having an average particle diameter of 1 μm to 10 μm is contained in a two component curing type heat-resistant resin containing a copolymer of tetrafluoroolefin and carboxylic acid vinyl ester to the surface of the outside substrate layer, and then drying to form a matte coat layer whose gloss value of the surface is controlled to be 1 to 30%, the process of forming an inside adhesion resin layer having adhesiveness to both the metallic foil as the barrier layer and a resin of an inside sealant layer described later on one chemical conversion-treated surface of the metallic foil, the process of laminating and forming the sealant layer containing a thermoplastic resin on the inside adhesion resin layer, and the process of heat treating a laminate obtained by the processes above with a heat roll heated to 130° C. to 220° C. in such a manner that the outside substrate layer is on the side of the heat roll. Therefore, it is a matter of course that the molding packaging material having various effects described above can be efficiently manufactured, and further the molding packaging material having sufficient lamination strength between the layers of the metallic foil and the polypropylene layer can be provided.

Therefore, when the obtained molding packaging material is molded into a battery case, for example, a reduction in the interlayer lamination strength caused by an influence of an electrolytic solution can be prevented and a reduction in the interlayer lamination strength caused by an influence of a generation of heat and an expansion and a contraction of the packaging material due to a repetition of charge and discharge can also be prevented and sufficient sealing performance can be secured. Moreover, since at least a surface to which a treatment liquid is applied of the metallic foil layer of a barrier layer is subjected to the chemical conversion treatment, the molding packaging material can be manufactured in which a corrosion of the surface of the metallic foil caused by contents (an electrolytic solution of a battery, foods, pharmaceuticals, and the like) can be sufficiently prevented. Furthermore, since the matte coat layer containing a specific heat-resistant resin composition containing a dispersion of solid fine particles, such as silica, and having a surface gloss value of 1 to 30% is provided on the surface of the outside substrate layer containing a heat-resistant resin, the packaging material on the surface of which moderate irregularities are formed, to which good slipping properties are imparted, and which is excellent also in molding properties can be obtained.

According to the invention of [16], since a propylene homopolymer or a polymer or a copolymer resin containing at least propylene and ethylene as a copolymerization component and having a melting point of 130° C. to 160° C. and an MFR of 1 g/10 min to 15 g/10 min is used as the thermoplastic resin of the inside sealant layer, a molding packaging material which has sufficient heat resistance and in which moderate fluidity can be realized in sealing, so that excellent sealing performance can be secured can be manufactured.

According to the invention of [17], since the inside adhesion resin layer is formed by applying and drying an adhesion resin containing a polyolefin resin having a carboxyl group and a multifunctional isocyanate compound and having an equivalent ratio [NCO]/[OH] of an isocyanate group of the multifunctional isocyanate compound to a hydroxyl group constituting the carboxyl group of the polyolefin resin of 1.0 to 10.0, a reduction with time in the adhesion strength between the metallic foil and the inside sealant layer by the electrolytic solution of the battery is sufficiently suppressed over a long period of time. Therefore, excellent electrolytic solution resistance is imparted and moreover the moisture penetration amount is small, and thus a stable packaging material for battery case with long life can be manufactured.

EMBODIMENTS FOR CARRYING OUT THE INVENTION

Figure 1:
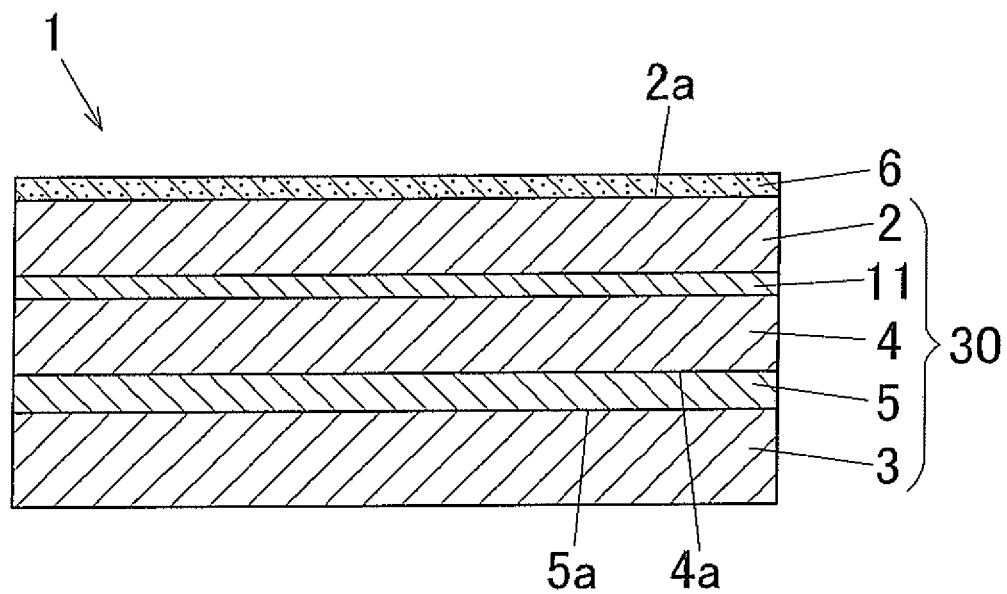
FIG. 1 is a cross sectional view illustrating one embodiment of a molding packaging material according to the present invention.

One preferable embodiment of a molding packaging material 1 according to the invention is illustrated in FIG. 1. The molding packaging material (1) is molded into an approximately rectangular parallelepiped shape whose upper surface is made to open, for example, to be used as a case of a lithium ion polymer secondary battery.

In the molding packaging material (1), an outside substrate layer (2) containing a heat-resistant resin film is laminated and integrated on one surface of a metallic foil (4) as a barrier layer through an adhesive layer (11) and also a two component curing type resin composition containing a dispersion of inorganic and/or organic solid fine particles in a heat-resistant resin component is applied to the outside surface of the outside substrate layer (2), i.e., a surface (2a) on the side opposite to the metallic foil, whereby and thus the matte coat layer (6) is formed. An inside sealant layer (3) containing a polypropylene resin is laminated and integrated on another surface (4a) of the metallic foil (4) through an inside adhesion resin layer (5) having adhesiveness to both the metallic foil (4) and the interface resin of an inside sealant layer (3).

The outside substrate layer (2) may have a single layer configuration containing a specific heat-resistant resin or a multilayer configuration containing various kinds of heat-resistant resin different in the type and the properties.

Similarly, the inside sealant layer (3) may be one having a heat adhesive resin layer containing polypropylene for at least the innermost layer, and another intermediate resin layer may be interposed between the inside adhesion resin layer (5) and the innermost layer of the inside sealant layer (3). In this case, the intermediate resin layer interposed therebetween is regarded as a part of the sealant layer (3) in the invention. The inside adhesion resin layer (5) may be a single composition of a polypropylene resin having a carboxyl group, for example, or a mixed composition of two or more kinds of substances different in the melting point.

(Outside Substrate Layer)

The outside substrate layer (2) containing a heat-resistant resin bears strength and good molding properties as a packaging material. Although not particularly limited, polyamide resin, such as 6 nylon, 66 nylon, and MXD nylon, or polyester resin is suitably used. Among the above, a biaxially oriented polyamide resin film, particularly 6 nylon, is preferably used. The heat-resistant resin film layer may be used as a single layer or two or more kinds thereof may be laminated for use. The thickness of the outside substrate layer (2) is preferably set to 12 to 50 μm and preferably about 15 to 30 μm. Due to the fact that the thickness is set to be equal to or higher than the preferable lower limit, sufficient strength as a packaging material can be secured and also due to the fact that the thickness is set to be equal to or lower than the preferable upper limit, stress in bulging and draw forming can be made small, so that the molding properties can be improved.

(Matte Coat Layer)

The matte coat layer (6) has a main function for improving the molding properties and preventing the appearance from being impaired due to adhesion of an electrolytic solution in the invention and is formed by applying a treatment liquid containing a resin composition containing a dispersion of inorganic and/or organic solid fine particles in a heat-resistant resin component, and then drying. By the formation of the matte coat layer (6), the gloss value of the outside surface of the packaging material (1) is controlled to about 30% or lower, particularly preferably 1 to 15%, and still more preferably 2 to 10%.

When the gloss value exceeds 30%, the improvement effect of the molding properties is poor. However, even when the gloss value is set to lower than 1%, there is no merit due to an improvement of the effect and, on the contrary, demerits, such as degradation of the surface appearance and an increase in cost, are noticeable.

The heat-resistant resin for use in the matte coat layer (6) is not particularly limited and one containing polyol as a main agent and multifunctional isocyanate as a curing agent is generally used. In particular, a heat-resistant resin in which fluorine is added to the skeleton of the main agent, such as a two component curing type heat-resistant resin, e.g., a copolymer of tetrafluoroolefin and carboxylic acid vinyl ester, a copolymer of tetrafluoroolefin and alkyl vinyl ether, a copolymer of chlorotrifluoroolefin and carboxylic acid vinyl ester, and a copolymer of chlorotrifluoroolefin and alkyl vinyl ether, can be used. Among the above, the copolymer of tetrafluoroolefin and carboxylic acid vinyl ester can be suitably used. By the use of the heat-resistant resin containing these fluorine components as a matrix component, the slipping properties of the surface of the matte coat layer (6) are further improved and more excellent antifouling property can be imparted. By adding a urethane resin and/or an acrylic resin to the fluorine containing resin, a further improvement of strength and molding properties may be achieved.

On the other hand, as the dispersion of solid fine particles contained in the resin component of the matte coat layer (6), not only inorganic particles but also organic particles can be used. The particles may be mixed. Herein, as the inorganic particles, one or two or more of silica, alumina, calcium oxide, calcium carbonate, calcium sulfate, calcium silicate, carbon black, and the like can be used, and, among the above, the use of silica is preferable. As the organic particles, fine particles of an acrylic acid ester compound, a polystyrene compound, an epoxy resin, a polyamide compound, crosslinked substances thereof, and the like can be used.

As the fine particles, one having an average particle diameter of 1 μm to 10 μm as the particle diameter is preferably used and particularly one having an average particle diameter of 2 μm to 5 μm is preferable. When fine particles having a particle diameter having an excessively small diameter of lower than 1 μm are used, the particles are buried in a coating liquid, a large amount of fine particles are required to be added in order to realize a desired gloss value, and sufficient slipping properties are hard to obtain. When particles having a large particle diameter of more than 10 μm are used, the diameter exceeds the coating thickness, so that the particles are likely to fall.

The content of the fine particles to be added is determined as appropriate in the range of 0.1 to 60 wt % according to the degree of the surface gloss value required in the packaging material and the particle diameter, the type, and the like of the fine particles to be added. Irrespective of the type of the fine particles to be used, when the content is lower than 0.1 wt %, a gloss value of 30% or lower is hard to realize. Thus, an improvement effect of the molding properties cannot be sufficiently obtained. On the contrary, when the particles are excessively contained in a proportion of higher than 60 wt %, there is a fear that the gloss value excessively decreases, so that the appearance is impaired. A preferable range of the content of the fine particles is in the range of 5 to 55 wt % and particularly preferably in the range of 20 to 50 wt %. In a case of using silica as the inorganic particles, when the particle diameter and the content are in the upper and lower limit range mentioned above, the gloss value is easily controlled in the range of 1 to 30% and particularly in the optimal range of 2 to 10%, and good slipping properties can be imparted to the surface.

(Outside Adhesive Layer)

An adhesive constituting the adhesive layer (11) includes, but not particularly limited thereto, a two component curing type urethane adhesive containing a polyol component and an isocyanate component and the like, for example. The two component curing type urethane adhesive is suitably used when bonding by a dry lamination method. The polyol component includes, but not particularly limited thereto, polyester polyol, polyether polyol, and the like, for example. The isocyanate component includes, but not particularly limited thereto, diisocyanates, such as TDI (tolylenediisocyanate), HDI (hexamethylenediisocyanate), and MDI (methylenebis(4,1-phenylene)diisocyanate), for example. The thickness of the adhesive layer (11) is preferably set to 2 μm to 5 μm and particularly preferably set to 3 μm to 4 μm.

In the adhesive layer (11), inorganic or organic antiblocking agents and amide slip agents may be added to the constituent resin described above insofar as the effects of the invention are not impaired.

(Barrier Layer—Metallic Foil—)

The metallic foil forming the barrier layer (4) has a function of giving gas barrier properties for preventing entering of oxygen or moisture into the molding packaging material (1). The metallic foil includes, but not particularly limited thereto, aluminum foil, copper foil, and the like, for example and the aluminum foil is generally used. The thickness of the metallic foil is preferably 20 μm to 100 μm. Due to the fact that the thickness is 20 μm or more, the generation of pinholes in rolling when manufacturing the metallic foil can be prevented. Due to the fact that the thickness is 100 μm or lower, stress in bulging and draw forming can be made small, so that the molding properties can be improved.

In the barrier layer (4), at least to the inside surface (4a), i.e., the surface on the side of the sealant layer (3), is subjected to chemical conversion treatment. By subjecting such chemical conversion treatment to the metallic foil, a corrosion of the surface of the metallic foil caused by contents (an electrolytic solution of a battery, foods, pharmaceuticals, and the like) can be sufficiently prevented. For example, the metallic foil is subjected to the chemical conversion treatment by carrying out the following treatment. More specifically, for example, 1) an aqueous solution containing a mixture of metallic salts of phosphoric acid, chromic acid, and fluoride, 2) an aqueous solution containing a mixture of phosphoric acid, chromic acid, and fluoride metallic and nonmetallic salts, 3) an aqueous solution containing a mixture of an acrylic resin or/and a phenol resin, phosphoric acid, chromic acid, and a fluoride metallic salt, and 4) an aqueous solution containing a mixture of an acrylic resin or/and a phenol resin, an phosphate or a phosphoric acid compound, a chromate or a chromic acid compound, and a fluoride metallic salt, are applied to the surface of the metallic foil subjected to degreasing treatment, and then dried to thereby form a chemical conversion film.

(Inside Adhesion Resin Layer)

With respect to the inside adhesion resin layer (5) for bonding the barrier layer (4) and the inside sealant layer (3), the selection of the material is particularly important in order to prevent a degradation with time of the lamination strength caused by an influence of an electrolytic solution and the like. An adhesive resin having good adhesiveness at least to both the metallic foil (aluminum) as the barrier layer (4) and an interface resin of the inside sealant layer (3) is required to use. A specific resin type includes, but not particularly limited thereto, a resin obtained by performing graft addition modification or copolymerization of dicarboxylic acids, such as maleic acid, fumaric acid, itaconic acid, and mesaconic acid, dicarboxylic acid anhydrides, such as maleic acid anhydride, fumaric acid anhydride, itaconic acid anhydride, and mesaconic acid anhydride, carboxyl group containing monomers, such as acrylic acid, methacrylic acid, crotonic acid, and itaconic acid, and the like, with polypropylene, for example. Among the above, a resin obtained by performing graft addition modification with maleic acid anhydride, acrylic acid, and methacrylic acid is preferably used, and particularly maleic anhydride modified polyolefin resin is preferable. A method for manufacturing the resin is not particularly limited and a solution method including dissolving polypropylene in an organic solvent, and then reacting the solution with acid (maleic acid anhydride and the like) in the presence of a radical generating agent, a melting method including heating and melting polypropylene, and then reacting the resultant substance with acid (maleic acid anhydride and the like) in the presence of a radical generating agent, and the like, can be mentioned, for example.

The inside adhesion resin layer (5) is particularly preferably constituted by an adhesive composition containing a polyolefin resin having a carboxyl group in the chemical structure and a multifunctional isocyanate compound in order to increase the useful life of the packaging material by sufficiently securing electrolytic solution resistance. The adhesion resin layer (5) is usually formed by applying an adhesive liquid containing a polyolefin resin having a carboxyl group, a multifunctional isocyanate compound, and an organic solvent to the barrier layer (4) or/and the inside sealant layer (3), and then drying the same.

The polyolefin resin having a carboxyl group (hereinafter also sometimes referred to as a "carboxyl group containing polyolefin resin") includes, but not particularly limited thereto, a modified polyolefin resin obtained by performing graft polymerization of ethylenic unsaturated carboxylic acid or an acid anhydride thereof with polyolefin, a copolymerization resin of an olefin monomer and ethylenic unsaturated carboxylic acid, and the like, for example. The polyolefin includes, but not particularly limited thereto, homopolymers of olefin monomers, such as ethylene, propylene, and butene, or copolymers of these olefin monomers, and the like, for example. The ethylenic unsaturated carboxylic acid includes, but not particularly limited thereto, acrylic acid, methacrylic acid, maleic acid, fumaric acid, crotonic acid, itaconic acid, and the like, for example. The ethylenic unsaturated carboxylic acid may be used singly or in combination of two or more kinds thereof. As the carboxyl group containing polyolefin resin, one which dissolves in an organic solvent is preferably used.

Among the above, as the carboxyl group containing polyolefin resin, it is preferable to use a modified polyolefin resin obtained by performing graft polymerization of ethylenic unsaturated carboxylic acid or an acid anhydride thereof with a homopolymer of propylene or a copolymer of propylene and ethylene.

The multifunctional isocyanate compound reacts with the carboxyl group containing polyolefin resin, and acts as a curing agent for curing an adhesive composition. The multifunctional isocyanate compound includes, but not particularly limited thereto, toluene diisocyanate, diphenyl methane diisocyanate, hexamethylene diisocyanate, isophorone diisocyanate, isocyanurate modified substances, biuret modified substances of the diisocyanate compounds, or modified substances obtained by performing adduct modification of the diisocyanate compounds with polyhydric alcohols, such as trimethylol propane, and the like, for example. The multifunctional isocyanate compounds may be used singly or in combination of two or more kinds thereof. As the multifunctional isocyanate compound, a multifunctional isocyanate compound which dissolves in an organic solvent is preferably used.

The organic solvents are not particularly limited insofar as the organic solvents can dissolve or disperse the carboxyl group containing polyolefin resin. Among the above, organic solvents which can dissolve the carboxyl group containing polyolefin resin are preferably used. As the organic solvents, organic solvents which can be easily volatilized and removed from the adhesive liquid by heating or the like are preferably used. Mentioned as the organic solvents which can dissolve the carboxyl group containing polyolefin resin and can be volatilized and removed by heating or the like are, for example, but not particularly limited thereto, aromatic organic solvents such as toluene and xylene, aliphatic organic solvents such as n-hexane, alicyclic organic solvents such as cyclohexane and methyl cyclohexane (MCH), ketone organic solvents such as methyl ethyl ketone (MEK), and the like. These organic solvents may be used singly or in combination of two or more kinds thereof.

In the adhesive liquid or the adhesion resin composition, the equivalent ratio [NCO]/[OH] of an isocyanate group of the multifunctional isocyanate compound to a hydroxyl group constituting the carboxyl group of the carboxyl group containing polyolefin resin is preferably set to 1.0 to 10.0. When the ratio is set in such a range, the adhesive composition excellent in the initial adhesion performance can be achieved and a reduction with time in the adhesion strength between the metallic foil layer (4) and the inside sealant layer (3) caused by an electrolytic solution of a battery can be sufficiently suppressed over a longer period of time, so that the electrolytic solution resistance can be further increased. The equivalent ratio [NCO]/[OH] is more preferably set to 1.5 to 9.0 and particularly preferably set to 1.5 to 6.0.

In the adhesive liquid and the adhesive composition, additives, such as a reaction accelerator, a tackifier, and a plasticizer, may be compounded, as required.

The thickness of the adhesion resin layer (5) is preferably set to 1 μm to 10 μm. When the thickness is 1 μm or more, sufficient adhesive strength can be obtained. When the thickness is 10 μm or lower, the water vapor barrier properties can also be improved.

The carboxyl group containing polypropylene resin of the adhesion resin layer (5) may be a single composition or a mixture of two or more kinds of substances different in the melting point.

(Inside Sealant Layer)

The resin constituting the inside sealant layer (3) includes, but not particularly limited thereto,
1) a random copolymer resin containing propylene and ethylene as a copolymerization component,
2) a copolymer resin containing propylene, ethylene, and butene as a copolymerization component,
3) a block copolymer resin containing propylene and ethylene as a copolymerization component,
4) a propylene homopolymer, and the like for example.

In the copolymer resin of each of 1) to 3) above, an olefin thermoplastic elastomer may be blended.

For the resin of the inside sealant layer (3), it is preferable to use a copolymer resin having a melting point of 130° C. to 160° C. The copolymer resin having a melting point of 130° C. to 160° C. refers to a resin having a peak temperature (melting point) measured by a DSC (differential scanning calorimeter) at a temperature elevation rate of 20° C./min of 130° C. to 160° C. Due to the fact that the melting point is 130° C. or higher, sufficient heat resistance can be secured and also, due to the fact that the melting point is 160° C. or lower, excellent sealing properties can be secured.

Among the resin 1) to the resin 4) above constituting the inside sealant layer (3), it is preferable to use a copolymer resin containing at least propylene and ethylene as a copolymerization component and having an MFR of 1 g/10 min to 15 g/10 min. The MFR (melt flow rate) is a value measured according to JIS K7210-1999 (Condition M). Due to the fact that the MFR is 1 g/10 min or more, extrusion lamination can be easily performed. Due to the fact that the MFR is 15 g/10 min or lower, the fluidity of the resin in sealing becomes moderate, so that more excellent sealing properties can be secured.

The thickness of the inside sealant layer (3) is preferably 10 to 80 μm. Due to the fact that the thickness is 10 μm or more, sufficient sealing strength can be obtained, and also, due to the fact that the thickness is 80 μm or lower, a water vapor barrier from the end surface can be sufficiently prevented from being damaged. It is a matter of course that the inside sealant layer (3) may be constituted by a single layer as mentioned above or a multilayer such as a co-extrusion film of polypropylene and one obtained by performing extrusion lamination of polypropylene two times. In the latter case, when a polypropylene layer with high fluidity is disposed on the outside (innermost layer side) of a polypropylene layer with low fluidity, an extremely reduction in the seal thickness due to an unusual flow of the polypropylene layer in sealing can be sufficiently prevented.

In the molding packaging material (1) of the configuration described above, the adhesion resin layer (5) is excellent in affinity to both the metallic foil as the barrier layer (4) and the inside sealant layer (3), and therefore the interlayer lamination strength between the layers can be sufficiently increased. Therefore, when the packaging material (1) is molded into a battery case, for example, a reduction in the interlayer lamination strength caused by an influence of an electrolytic solution can be prevented and a reduction in the interlayer lamination strength caused by an influence of a generation of heat and an expansion and a contraction of the packaging material due to a repetition of charge and discharge can also be prevented, so that sufficient sealing properties can be secured.

(Manufacturing Method)

Next, an example of a method for manufacturing the molding packaging material (1) of the invention is described with reference to FIGS. 1 and 2.

First, a biaxially oriented polyamide film (2) as the outside substrate layer (2) is bonded to one surface of the metallic foil as the barrier layer (4) with the adhesive (11) by a dry lamination method, for example. Furthermore, the matte coat layer (6) containing a two component curing type heat-resistant resin containing a dispersion of inorganic particles is formed by coating on the biaxially oriented polyamide film (2).

As the barrier layer (4), a metallic foil in which at least the inside surface (surface to which a treatment liquid to be used in the following process is applied) (4a) is subjected to chemical conversion treatment is used. The metallic foil (4) in which both surfaces are subjected to chemical conversion treatment may also be used.

On the other surface (inside surface) (4a) of the barrier layer (4), the inside sealant layer (3) is formed through the adhesion resin layer (5) having good adhesiveness to both the metallic foil and the interface side resin of the inside sealant layer. Thus, a laminate (30) is obtained (FIG. 1).

Subsequently, a two component curing type resin liquid containing a dispersion of inorganic and/or organic fine particles, such as silica, in a heat-resistant resin component in which fluorine is added to the skeleton of a main agent, for example, is applied to the outside surface of the outside substrate layer (2) of the laminate (30), and then dried, thereby obtaining the matte coat layer (6) in which the surface gloss value is controlled in the range of 1 to 30%. A method for applying the two component curing type resin liquid for the formation of the matte coat layer (6) includes, but not particularly limited thereto, a gravure roll method, for example.

Figure 2:
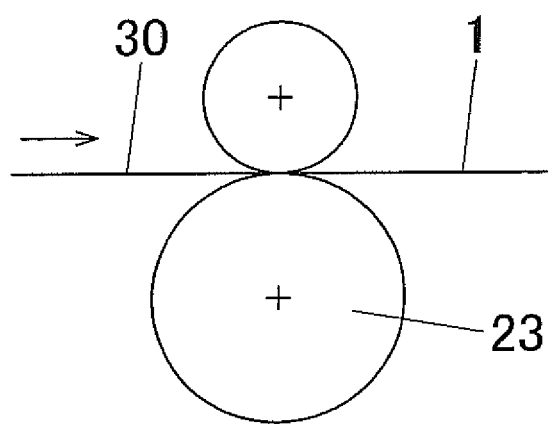
FIG. 2 is a schematic explanatory view illustrating a method for manufacturing a molding packaging material according to the present invention.

Subsequently, the laminate (30) was passed through a heat roll (23) heated to 130° C. to 220° C. in such a manner that the matte coat layer (6) on the outermost surface of the laminate (30) is on the side of the heat roll, thereby obtaining the molding packaging material (1) of the invention illustrated in FIG. 1 (FIG. 2).

The molding packaging material (1) of the invention is manufactured into a packaging container body for a battery case, foods, and pharmaceuticals, and the like by molding (bulging, deep draw forming, and the like) into various shapes, such as a rectangular parallelepiped shape with a high molding height. In the battery case, the food packaging container, and the pharmaceutical packaging container obtained by performing such molding, the contents are prevented from entering between the layers of the barrier layer (4) formed with a metallic foil and the inside adhesion resin layer (5). Therefore, when molded into a battery case, for example, a reduction in the lamination strength caused by an influence of an electrolytic solution can be prevented and a reduction in the lamination strength caused by an influence of a generation of heat and an expansion and a contraction of the packaging material due to a repetition of charge and discharge can be prevented, so that favorable sealing performance can be maintained over a long period of time.

EXAMPLES

Next, specific Examples of the invention are described but the invention is not particularly limited to those Examples.

Example 1

A chemical conversion treatment liquid containing polyacrylic acid, a trivalent chromium compound, water, and alcohol was applied to both surfaces of a 40 μm thick aluminum foil (4) (substrate layer), the aluminum foil was dried at 180° C., and then chemical conversion treatment was carried out in such a manner that the chromium adhesion amount was 10 mg/m$^2$.

Then, a 15 μm thick biaxially oriented 6 nylon film (2) (outside substrate layer) was dry laminated on one surface of the aluminum foil with a two component curing type urethane adhesive (11).

Furthermore, a maleic acid modified polypropylene resin (5) (inside adhesive layer) having adhesiveness to both metallic foil and polypropylene and an ethylene-propylene random copolymer resin (3) having a melting point of 140° C. and an MFR of 7 g/10 min were extruded and prepared as a laminate film on the other surface (4a) of the aluminum foil (4) by a T die method in such a manner that the maleic acid modified polypropylene resin layer was 7 μm and the ethylene-propylene random copolymer layer was 28 μm.

Subsequently, the laminate film was placed on the chemical conversion-treated surface of the aluminum foil (4), and then passed through a heat roll heated to 150° C., thereby obtaining a laminate (30).

Subsequently, a two component curing type resin composition containing 50 wt % of silica having an average particle diameter of 3 μm and a copolymer of tetrafluoroorefin and carboxylic acid vinyl ester was applied to the surface of the outside substrate layer with a gravure roll, and then dried to thereby form a matte coat layer (6), whereby a molding packaging material (1) illustrated in FIG. 1 was obtained.

Each composition, each component, and the like of the matte coat layer (6), the inside adhesion resin layer (5), and the inside sealant layer (3) are as shown in Table 1.

In Table 1, the following abbreviated names are used.

Fluorine-added two component curing type resin: Two component curing type resin composition containing a copolymer of tetrafluoroolefin and carboxylic acid vinyl ester m-PP: Maleic acid anhydride modified polypropylene (Modified polypropylene resin obtained by performing graft polymerization of maleic acid anhydride with a copolymer of propylene and ethylene)

M-PP: Maleic acid anhydride modified polypropylene (Modified polypropylene resin obtained by performing graft polymerization of maleic acid anhydride with a copolymer of propylene and ethylene)

Random PP: Propylene-ethylene random copolymer resin

Block PP: Propylene-ethylene block copolymer resin

Homo PP: Polypropylene resin

Multifunctional isocyanate: Polymer body of hexamethylene diisocyanate (NCO content of 23.1 mass %)

Examples 2 to 7

Various kinds of molding packaging materials were obtained in the same manner as in Example 1, except changing the component composition of the matte coat layer (6) to various kinds of component compositions.

Example 8

A 15 μm thick biaxially oriented 6 nylon film (2) formed by an inflation method was dry laminated on one surface of an aluminum foil (4) (barrier layer) in which both surfaces were subjected to conversion treatment with a two component curing type urethane adhesive (11) in the same manner as in Example 1.

Subsequently, a 60 μm thick propylene-ethylene random copolymer film (3) (the innermost layer of a sealant layer) was laminated and integrated on the other surface (4a) of the aluminum foil (4) by a sandwich lamination method through an extruded resin layer (the outermost layer of the sealant layer) obtained by extruding a maleic anhydride modified polypropylene resin (5) (inside adhesion resin layer) and a propylene-ethylene random copolymer resin having a melting point of 130° C. and an MFR of 20 g/10 min from an extrusion die of an extrusion machine, and adjusting the thickness to be 20 μm.

Subsequently, a two component curing type heat-resistant resin composition containing 45 wt % of silica having an average particle diameter of 5 μm, in which fluorine was added to the skeleton of a main agent, was applied with a gravure roll, and then dried to form a matte coat layer (6). A molding packaging material (1) was obtained in the same manner as in Example 1, except the operation above.

Example 9

A 15 μm thick biaxially oriented 6 nylon film (2) formed by an inflation method was dry laminated on one surface of an aluminum foil (4)(barrier layer) in which both surfaces were subjected to conversion treatment with a two component curing type urethane adhesive (11) in the same manner as in Example 1.

Subsequently, an adhesive in which 0.9 g of a polymer body of hexamethylene diisocyanate (multifunctional isocyanate compound, NCO content of 23.1 mass %) was mixed in a solution in which 15 g of maleic acid modified polypropylene (modified polypropylene resin obtained by performing graft polymerization of maleic anhydride with a copolymer of propylene and ethylene, Melting temperature: 77° C., Acid value: 10 mgKOH/g) was dissolved in 85 g of a mixed solvent (mixed solvent of methyl cyclohexane: methyl ethyl ketone=8 parts by mass:2 parts by mass) in such a manner that the equivalent ratio [NCO]/[OH] was 1.8 was applied onto the other surface (4a) of the aluminum foil (4), and then dried at 80° C. to form a 3 μm thick inside adhesion resin layer (5). Then, an 80 μm thick non-oriented three-layer film (3) containing a propylene-ethylene random copolymer, block polypropylene, and a propylene-ethylene random copolymer (inside sealant layer) shown in Table 1 was dry laminated on the surface of the dried adhesion resin layer (5). A molding packaging material (1) was obtained in the same manner as in Example 1, except the operation above.

Example 10

A molding packaging material (1) was obtained in the same manner as in Example 9, except using an adhesion resin shown in Table 1 for the constituent material of the inside adhesion resin layer (5) and using a 80 μm thick non-oriented homopolypropylene film for the sealant layer (3).

Example 11

A molding packaging material (1) was obtained in the same manner as in Example 9, except using an adhesion resin shown in Table 1 for the constituent material of the inside adhesion resin layer (5) and using an 80 μm thick non-oriented two-layer film containing homopolypropylene and a propylene-ethylene random copolymer shown in Table 1 for the sealant layer (3).

Comparative Example 1

A molding packaging material was obtained in the same manner as in Example 1, except not having the matte coat layer (6).

Comparative Example 2

A molding packaging material was obtained in the same manner as in the adhesion resin layer in Example 9 and the sealant layer in Example 10, except not having the matte coat layer (6).

The melting point mentioned in the description of each Example and each Comparative Example is a melting point measured at a temperature elevation rate of 20° C./min using an automatic differential scanning calorimeter (Product number: DSC-60A) manufactured by Shimadzu Corp.

Each molding packaging material obtained as described above was evaluated for the performance based on the following evaluation methods. The results are shown in Table 1.

TABLE 1

| | | | Example 1 | Example 2 | Example 3 | Example 4 | Example 5 | Example 6 | Example 7 |
|---|---|---|---|---|---|---|---|---|---|
| Matte coat layer | Heat resistant resin | | Fluorine-added two component curing type resin | ← | ← | ← | ← | ← | ← |
| | Solid fine particles | Type | Silica | Silica | Silica | Silica | Silica | Acryl | Silica |
| | | Particle diameter (μm) | 3 | 3 | 3 | 2 | 2 | 2 | 2 |
| | | Content (wt %) | 50 | 55 | 42 | 28 | 18 | 45 | 58 |
| | Coating amount (μm) | | 3 | 3 | 3 | 3 | 2 | 3 | 3 |
| Surface gloss value (%) | | | 3.5 | 2 | 5.5 | 14 | 25.2 | 3.5 | 3.5 |
| Adhesion resin layer | Type | | m – PP | ← | ← | ← | ← | ← | ← |
| | Equivalent ratio [NCO]/[OH] | | — | — | — | — | — | — | — |
| | Melting point (° C.) | | 140 | ← | ← | ← | ← | ← | ← |
| | MFR (g/10 min) | | 7 | — | — | — | — | — | — |
| | Viscosity of adhesive (mPa · S (25° C.)) | | — | — | — | — | — | — | — |
| | Thickness (μm) | | 7 | ← | ← | ← | ← | ← | ← |
| Extruded resin layer | Type | | | | | | | | |
| | Melting point (° C.) | | | | | | | | |
| | MFR (g/10 min) | | | | | | | | |
| | Thickness (μm) | | | | | | | | |
| Sealant layer | Type | | Random PP | ← | ← | ← | ← | ← | ← |
| | Melting point (° C.) | | 140 | ← | ← | ← | ← | ← | ← |
| | MFR (g/10 min) | | 7 | ← | ← | ← | ← | ← | ← |
| | Thickness (μm) | | 28 | ← | ← | ← | ← | ← | ← |
| Performance evaluation | Molding properties | | ◎ | ◎ | ◎ | ◎ | ◎ | ◎ | ◎ |
| | Electrolytic solution adhesion appearance | | ◎ | ◎ | ◎ | ◎ | ◎ | ◎ | ◎ |
| | Lamination strength | | ◎ | ◎ | ◎ | ◎ | ◎ | ◎ | ◎ |
| | Electrolytic solution resistance | | ◎ | ◎ | ◎ | ◎ | ◎ | ◎ | ◎ |
| | Sealing performance | | ◎ | ◎ | ◎ | ◎ | ◎ | ◎ | ◎ |

| | | | Example 8 | Example 9 | Example 10 | Example 11 | Comparative Example 1 | Comparative Example 2 |
|---|---|---|---|---|---|---|---|---|
| Matte coat layer | Heat resistant resin | | ← | ← | ← | ← | | |
| | Solid fine particles | Type | Silica | Silica + Acryl | Silica | Silica | | |
| | | Particle diameter (μm) | 5 | 5 | 5 | 5 | | |
| | | Content (wt %) | 45 | 45 | 45 | 45 | | |
| | Coating amount (μm) | | 3 | 3 | 3 | 3 | | |
| Surface gloss value (%) | | | 3.5 | 3.5 | 3.5 | 3.5 | | |
| Adhesion resin layer | Type | | ← | M – PP + Multi-functional isocyanate | M – PP + Multi-functional isocyanate | M – PP + Multi-functional isocyanate | m – PP | M – PP + Multi-functional isocyanate |
| | Equivalent ratio [NCO]/[OH] | | — | 1.8 | 1.8 | 1.8 | — | 1.8 |
| | Melting point (° C.) | | 160 | 77 | 85 | 80 | 140 | 77 |
| | MFR (g/10 min) | | 8 | — | — | — | 7 | — |
| | Viscosity of adhesive (mPa · S (25° C.)) | | — | 30 | 25 | 30 | — | 30 |
| | Thickness (μm) | | 5 | 3 | 3 | 3 | 7 | 3 |
| Extruded resin layer | Type | | Random PP | | | | | |
| | Melting point (° C.) | | 130 | | | | | |
| | MFR (g/10 min) | | 20 | | | | | |
| | Thickness (μm) | | 15 | | | | | |
| Sealant layer | Type | | Random PP | Random PP Block PP Random PP | Homo PP | Homo PP Random PP | Random PP | Homo PP |
| | Melting point (° C.) | | 140 | 140 160 140 | 160 | 160 140 | 140 | 160 |
| | MFR (g/10 min) | | 8 | 7 2 7 | 7 | 7 7 | 7 | 7 |
| | Thickness (μm) | | 60 | 12 56 12 | 80 | 64 16 | 28 | 60 |

TABLE 1-continued

| | | | | | | | |
|---|---|---|---|---|---|---|---|
| Performance evaluation | Molding properties | ◎ | ◎ | ◎ | ◎ | X | X |
| | Electrolytic solution adhesion appearance | ◎ | ◎ | ◎ | ◎ | X | X |
| | Lamination strength | ◎ | ○ | ◎ | ○ | ◎ | ◎ |
| | Electrolytic solution resistance | ◎ | ◎ | ◎ | ◎ | ◎ | ◎ |
| | Sealing performance | ◎ | ◎ | ◎ | ◎ | ◎ | ◎ |

*The viscosity of the adhesion resin is a viscosity measured using a B type rotational viscometer at 25° C.

<Molding Properties Evaluation Method>

The molding packaging materials were subjected to bulging into a rectangular parallelepiped shape of Length of 55 mm×Width of 35 mm×Depth of 8 mm using a bulging machine manufactured by Amada Co., Ltd. (Product number: TP-25C-X2), and the molding properties were evaluated based on the following judgment criteria.

(Judgment Criteria)

"◎" Pinholes were not generated and also cracks were not generated.

"Δ" Pinholes were slightly generated in a small portion but substantially hardly generated.

"x" Pinholes and cracks were generated in corner portions.

<Lamination Strength Evaluation Method>

The molding packaging materials were cut into a 15 mm width to form measurement pieces, and the lamination strength (lamination strength of the inside adhesion resin layer (5) and the inside sealant layer (3)) of the measurement pieces was measured by a tensile test machine under a 80° C. atmosphere.

(Judgment Criteria)

"◎" The lamination strength is 5 N/15 mm width or more.

"○" The lamination strength is 3 N/15 mm width or more and lower than 5 N/15 mm width.

"x" The lamination strength is lower than 3 N/15 mm width.

<Electrolytic Solution Resistance Evaluation Method>

The molding packaging materials were cut into a 15 mm width to form measurement pieces, a solution in which lithium hexafluorophosphate was dissolved in a mixed solvent in which ethylene carbonate and diethylene carbonate were mixed with a capacity ratio of 1:1 in such a manner that the concentration was 1 mol/L and the measurement pieces were placed in a wide-mouth bottle formed with polytetrafluoroethylene, the bottle was stored in a 85° C. oven for one week, the measurement pieces were taken out, and then the inside adhesion resin layer (5) and the inside sealant layer (3) were separated at the interface to measure the lamination strength (adhesion strength) between the layers.

(Judgment Criteria)

"◎" With respect to the measured adhesion strength, the retention rate is 90% or more based on the initial adhesion strength.

"○" With respect to the measured adhesion strength, the retention rate is 60% or more and lower than 90% based on the initial adhesion strength.

"Δ" With respect to the measured adhesion strength, the retention rate is 30% or more and lower than 60% based on the initial adhesion strength.

"x" With respect to the measured adhesion strength, the retention rate is lower than 30% based on the initial adhesion strength (including one in which interlayer separation occurred during immersion).

<Electrolytic Solution Adhesion Appearance Evaluation>

The molding packaging materials were cut into 10 cm×10 cm, 1 cc of a solution in which lithium hexafluorophosphate was dissolved in a mixed solvent in which ethylene carbonate and diethylene carbonate were mixed with a capacity ratio of 1:1 in such a manner that the concentration was 1 mol/L was added dropwise to the outermost surface of the molding packaging materials, and then the appearance was evaluated when the surface of a portion to which the liquid droplets adhere was rubbed back and forth 10 times using a rubbing implement in which cotton was wound around a weight with a diameter of 1 cm and a weight of 1 Kg with the wound cotton.

"◎" The appearance did not change even when the portion was rubbed back and forth 10 times.

"Δ" The appearance changed when the portion was rubbed back and forth 5 times.

"x" The appearance change when the portion was rubbed back and forth once.

<Sealing Performance Evaluation Method>

A seal separation test was carried out under the conditions of 25° C. and 80° C. using TENSILON RTA-100 manufactured by Orientec Co., Ltd., and a constant temperature bath TCF-III1-B manufactured by Baldwin, Inc., and then the sealing performance was evaluated. With respect to the sealing conditions, the sealing was performed for each molding packaging material at a sealing width of 5 mm, a sealing pressure of 0.3 MPa, a sealing time of 1 second, and a sealing temperature of 160° C. and 180° C. (both surface heating).

(Sealing Performance Judgment Criteria)

"◎" Those having a strength of 30 N/15 mm or more in both a case where the sealing was carried out at 160° C. and the seal separation test was carried out at 25° C. and a case where the sealing was carried out at 180° C. and the seal separation test was carried out at 80° C.

"○" Those having a strength of 25 N/15 mm or more and lower than 30 N/15 mm was obtained in both a case where the sealing was carried out at 160° C. and the seal separation test was carried out at 25° C. and a case where the sealing was carried out at 180° C. and the seal separation test was carried out at 80° C.

"x" Those not falling under the criteria above (poor sealing performance).

<Gloss Value>

The gloss value was measured at a reflection angle of 60° using a "micro-TRI-gloss-s" manufactured by BYK as a measurement apparatus.

As is clear from the performance evaluation results of Table 1, in the molding packaging materials of Examples 1 to 11 of the invention, the gloss value of the outside surface is controlled to a sufficiently small value, and, as a result, it was able to be confirmed in the molding test that pinholes and cracks are not generated and the molding properties are excellent. It was able to be confirmed that the packaging materials originally achieve sufficient interlayer lamination strength and are excellent also in electrolytic solution resistance, electrolytic solution adhesion appearance, and sealing performance.

On the other hand, in the molding packaging materials of Comparative Examples 1 and 2 not having the matte coat layer, the molding properties were inferior.

The present application claims priority of Japanese Unexamined Patent Application Publication No. 2011-72461, filed on Mar. 29, 2011 and the entire disclosure is a part of the present application.

INDUSTRIAL APPLICABILITY

The molding packaging material according to the invention is suitably used as a case material of secondary batteries, such as lithium ion batteries for notebook personal computers, cellular phones, and on-vehicle and fixed type power sources, and also is suitably used as a packaging material for foods, pharmaceuticals, and the like.

DESCRIPTION OF THE REFERENCE NUMERALS

1 Molding packaging material
2 Outside substrate layer (heat-resistant resin layer)
3 Inside sealant layer (thermoplastic resin)
4 Barrier layer (metallic foil)
5 Inside adhesion resin layer
6 Matte coat layer
11 Adhesive layer
23 Heat roll

The invention claimed is:

1. A method for manufacturing a molding packaging material, comprising:
    a step of subjecting at least one surface of a metallic foil for a barrier layer to chemical conversion treatment;
    a step of bonding a biaxially oriented polyamide film to the other surface of the metallic foil with an outside adhesive to form an outside substrate layer;
    a step of applying a resin composition in which 0.1 wt % to 60 wt % of a dispersion of inorganic and/or organic solid fine particles having an average particle diameter of 1 μm to 10 μm is contained in a two component curing type heat-resistant resin to a surface of the outside substrate layer, and then drying to form a matte coat layer whose gloss value is controlled to be 1 to 30%;
    a step of forming an inside adhesion resin layer having adhesiveness to both the metallic foil as the barrier layer and a resin of an inside sealant layer described later on one chemical conversion-treated surface of the metallic foil;
    a step of laminating and forming the sealant layer containing a thermoplastic resin on the inside adhesion resin layer; and
    a step of heat treating a laminate obtained by the steps above with a heat roll heated to 130° C. to 220° C. in such a manner that the outside substrate layer is on the side of the heat roll.

2. The method for manufacturing a molding packaging material according to claim 1, wherein a resin containing a propylene homopolymer or a copolymer resin containing at least propylene and ethylene as a copolymerization component and having a melting point of 130° C. to 160° C. and an MFR of 1 to 25 g/10 min is used as the thermoplastic resin of the sealant layer.

3. The method for manufacturing a molding packaging material according to claim 1, wherein the inside adhesion resin layer is formed by applying and drying an adhesion resin containing a polyolefin resin having a carboxyl group and a multifunctional isocyanate compound and having an equivalent ratio [NCO]/[OH] of an isocyanate group of the multifunctional isocyanate compound to a hydroxyl group constituting the carboxyl group of the polyolefin resin of 1.0 to 10.0.

4. The method for manufacturing a molding packaging material according to claim 1, wherein the two component curing type heat-resistant resin includes a copolymer of tetrafluoroolefin and carboxylic acid vinyl ester.

* * * * *